United States Patent [19]

Waugh et al.

[11] Patent Number: 4,612,075

[45] Date of Patent: Sep. 16, 1986

[54] SUBSTRATELESS TRIM STRIP AND METHOD OF MAKING

[75] Inventors: Robert E. Waugh, Sun City Center, Fla.; Urban R. Nannig, North Kingstown, R.I.; Clyde R. Rockwood, Columbus, Ohio

[73] Assignee: The D. L. Auld Company, Columbus, Ohio

[21] Appl. No.: 744,014

[22] Filed: Jun. 12, 1985

[51] Int. Cl.⁴ .................................................. B60R 13/04
[52] U.S. Cl. .................................... 156/242; 156/247; 156/249; 264/130; 264/131; 264/132
[58] Field of Search ............... 156/242, 247, 249; 264/130, 131, 132

[56] References Cited

U.S. PATENT DOCUMENTS

| | | | |
|---|---|---|---|
| 1,693,561 | 11/1928 | Klein | 427/282 |
| 2,021,961 | 11/1935 | MacFarlane | 264/130 |
| 2,354,857 | 8/1944 | Gits et al. | 428/187 X |
| 2,376,305 | 5/1945 | Bauer | 428/187 X |
| 3,235,396 | 2/1966 | Haberlin | 428/40 |
| 3,843,425 | 10/1974 | Kent | 428/31 X |
| 3,914,482 | 10/1975 | Sawa et al. | 428/31 |
| 3,964,906 | 6/1976 | Kenney | 427/54 X |
| 3,974,311 | 8/1976 | Cherrin | 428/43 |
| 4,010,297 | 3/1977 | Wenrick | 428/31 |
| 4,100,010 | 7/1978 | Waugh | 428/64 X |
| 4,135,033 | 1/1979 | Lawton | 428/442 X |
| 4,210,693 | 7/1980 | Regan et al. | 428/162 X |
| 4,220,681 | 9/1980 | Narita | 428/31 |
| 4,259,388 | 3/1981 | Reed | 428/28 X |
| 4,296,155 | 10/1981 | Madonia | 428/31 |
| 4,331,704 | 5/1982 | Watson, Jr. et al. | 427/54.1 |
| 4,332,074 | 6/1982 | Auld et al. | 264/132 X |
| 4,351,686 | 9/1982 | Clark | 428/448 X |
| 4,356,617 | 11/1982 | Coscia | 264/132 X |
| 4,409,264 | 10/1983 | Gilleo et al. | 428/156 X |
| 4,446,179 | 5/1984 | Waugh | 428/31 |
| 4,460,429 | 7/1984 | Coscia et al. | 156/219 X |
| 4,481,160 | 11/1984 | Bree | 428/13 X |

Primary Examiner—Henry F. Epstein
Attorney, Agent, or Firm—Killworth, Gottman, Hagan & Schaeff

[57] ABSTRACT

A decorative trim strip and method of manufacture are provided. The trim strip includes a plastic cap overlying a printed and/or decorated upper surface of an adhesive layer. The need for an intermediate metal, plastic, or paper substrate is eliminated. By treating the upper surface of the adhesive to render it tack free, the printing and/or decoration may be applied to that surface and the cap formed directly thereon.

16 Claims, 4 Drawing Figures

U.S. Patent  Sep. 16, 1986  4,612,075
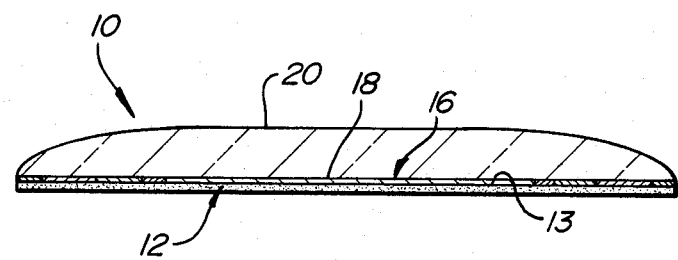
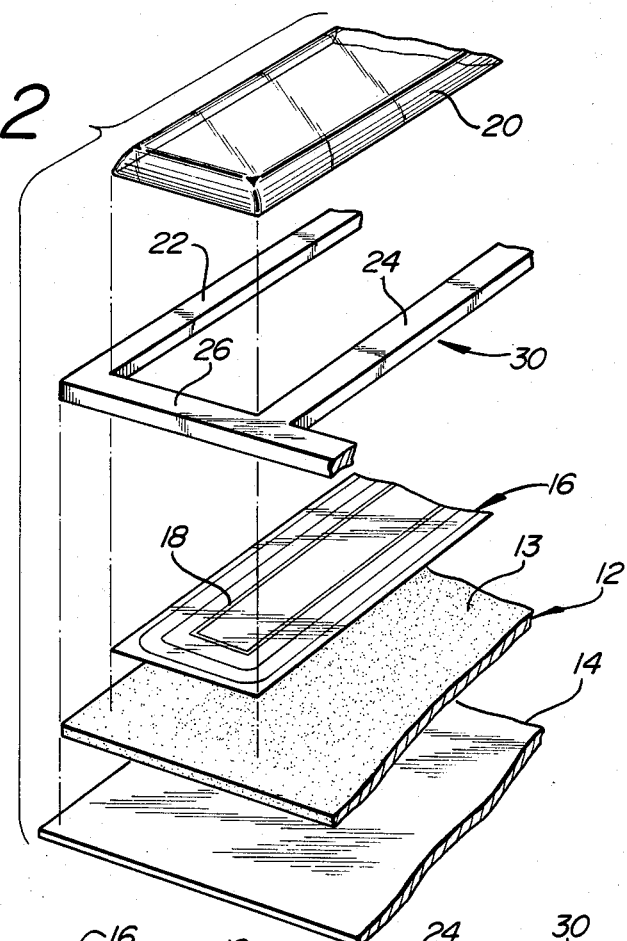
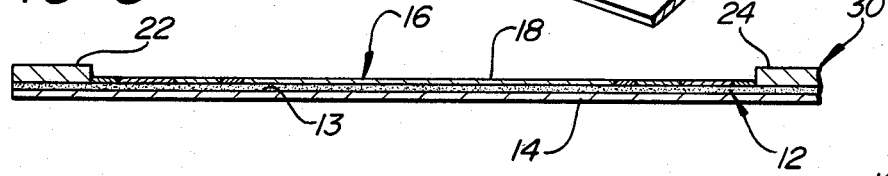
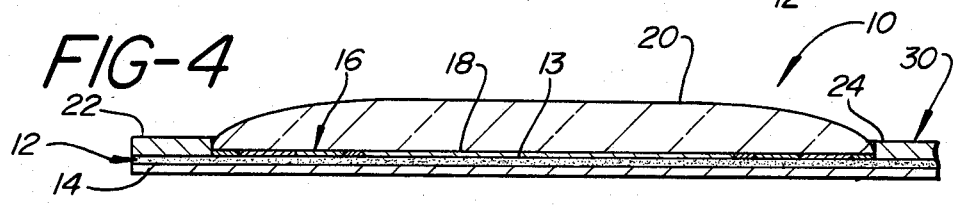

SUBSTRATELESS TRIM STRIP AND METHOD OF MAKING

BACKGROUND OF THE INVENTION

The invention relates to an elongate strip or molding of the type attached to an automobile body or the like for protection and decoration and methods for its manufacture.

Trim strips of various configurations have been used in the automotive industry to decorate and protect the surfaces of an automobile, especially body side surfaces. In recent years, emphasis has been placed on replacing chromed metallic trim strips with plastic trim strips which do not corrode and which can be attached to an automobile body adhesively without fasteners. Examples of plastic trim or molding strips include Waugh, U.S. Pat. No. 4,446,179, Madonia, U.S. Pat. No. 4,206,155, Narita, U.S. Pat. No. 4,220,681, Wenrick, U.S. Pat. No. 4,010,297, Sawa et al, U.S. Pat. No. 3,914,482, and Kent, U.S. Pat. No. 3,843,425.

Many of these trim strips are formed on plastic resin substrates onto which another layer or layers of decorative metal or plastic are placed. For example, Waugh, U.S. Pat. No. 4,446,179, discloses a trim strip having an adhesively-backed foil substrate of metal or plastic over which is cast a curable liquid plastic resin. The resin forms a lens cap over the substrate, giving a lens effect to the decorative indicia printed on the foil.

However, the need for such foil substrates adds to the costs of manufacture of such trim strips. Additionally, the thickness of the substrate may limit the overall flexibility of the trim strip and make it more difficult to adhere permanently to contoured surfaces. Accordingly, there is a need in the art for a trim strip and method of manufacture which is both inexpensive to make and has the requisite flexibility to mold and adhere to contoured surfaces.

SUMMARY OF THE INVENTION

The present invention provides a plastic-capped trim strip and process of manufacture in which decorative indicia and the like are printed directly onto the upper surface of an adhesive layer. The present invention eliminates the need for an intermediate metal, paper, or plastic substrate and produces a finished flexible elongate trim strip which is ready to be adhered to any intended surface such as the side of an automobile body. Likewise, it can be used as an insert for premolded trim, bumpers, or bumper guards.

According to one aspect of the present invention, a substrateless trim strip is made by the steps of providing an elongate layer of pressure sensitive adhesive on a support surface and forming a plurality of spaced, elongate raised boundaries on one surface of the pressure sensitive adhesive. The raised boundaries are spaced apart to provide at least one open area running lengthwise on the elongate layer of pressure sensitive adhesive. This open area corresponds to the external shape of the final trim strip structure. The open area is then treated to render the upper surface of the adhesive tack free in this area and suitable for silk screening or otherwise printing directly on the treated upper surface. In another embodiment of the invention, the upper surface of the pressure sensitive adhesive is treated to render it tack-free and, then, raised boundries are formed to create at least one enclosed area to be decorated.

The treated upper surface of the adhesive is then decorated, as desired, by silk screening or otherwise printing background colors and/or indicia thereon. A measured amount of the curable liquid plastic resin may be cast onto the decorated surface and flows to the edges of the raised boundaries. In the preferred embodiment, the resin forms a positive meniscus over the decorated area without overflowing the edges of the raised boundaries. The resin is then cured and hardened to provide one or more elongate substrateless trim strips having plastic lens caps thereon. Alternatively, a relatively flat cap may be applied by flow coating, spraying or laminating. After formation of the plastic cap, the individual trim strips may then be separated from the assembly. Preferably, that assembly also includes a release liner.

Thus, a preferred method of forming the trim strip of the present invention includes providing the elongate layer of pressure sensitive adhesive supported on a release liner. The adhesive may be applied to the release liner in a conventional manner such as by spraying or roll coating. The raised boundries are formed by laminating to the adhesive surface cover strips, spaced apart to form at least one elongated open area. The open area is then treated, decorated, and has a plastic cap cast thereon as described above. After the trim strips have been formed, and the plastic cap cured, the individual trim strips may be readily peeled off of the release liner. The raised boundary formed by the cut edges of the cover strips acts as a knife edge of sorts such that when the trim strip is peeled from the assembly, the underlying adhesive will break sharply at those areas resulting in a trim strip having crisp edges. Alternatively a cutting operation may also be used to separate individual trim strips (with release liner attached) from the overall assembly.

The present invention thus provides a trim strip without the need for an intermediate metal, paper, or plastic substrate as required by prior art trim strips. The trim strip of the present invention provides increased flexibility and relative ease of manufacture.

Accordingly, it is an object of the present invention to provide a substrateless trim strip and process of manufacture. This, and other objects and advantages of the invention, will become apparent from the following detailed description, the accompanying drawings, and the appended claims.

BRIEF DESCRIPTION OF THE DRAWINGS

FIG. 1 is a cross-sectional view of a trim strip produced by the process of the present invention as picked from the assembly;

FIG. 2 is an exploded perspective view in partial section of the decorated layer of pressure sensitive adhesive with cover strips thereon;

FIG. 3 is a cross-sectional view of the trim strip assembly prior to casting of the plastic resin; and FIG. 4 is a cross-sectional view of the trim strip assembly after the plastic resin has been cast.

DETAILED DESCRIPTION OF THE PREFERRED EMBODIMENTS

FIG. 1 illustrates in cross section a substrateless trim strip made in accordance with the process of the present invention. Trim strip 10 has a layer of pressure sensitive adhesive 12 having an upper and a lower surface. Pressure sensitive adhesive 12 can be any of a number of commercially available adhesives such as, for example, an acrylic pressure sensitive adhesive.

The upper surface 13 of adhesive 12 has been treated, as explained in further detail below, to render it tack free. As shown in the figures, a non-tacky surface 16 covers the upper surface 13 of adhesive 12. Non-tacky surface 16 is preferably a clear lacquer one, but may also be a particle layer (such as talc or mica). Alternatively a thin, bright metallic layer, approximately 0.0001 inch thick or less, may be applied by hot stamping or spray metallizing, and serves to provide a bright or colored background for indicia 18 printed thereon. Indicia 18 may be any desirable decoration including words, numbers, symbols, pictures, or combinations thereof. Adhesive 12 may itself be colored, by any number of means, to serve as a background for indicia 18 or, in some instances, eliminating the need for non-tacky surface 16 and indicia 18 (as for instance when the trim strip is to simply be the solid color of the adhesive).

In the preferred embodiment, a cured, clear plastic lens cap 20 overlies and encapsulates indicia 18. As can be seen from FIG. 1, the edge of lens cap 20 is contiguous with the layer of adhesive 12, and forms a positive-shaped meniscus. This meniscus contributes to the lens effect of cap 20, enhancing the beauty of the printed indicia 18 while at the same time providing a tough, weather-resistant protective covering. Cap 20 may be formed of any castable plastic resin which is curable to a clear, tough compound. Preferably, a two-part polyurethane resin is used; although, other castable plastics may also be used. Such resins may be cured by either heat or exposure to ultraviolet or other radiation.

Referring now to FIGS. 2, 3, and 4, the substrateless trim strip of the present invention is preferably produced by the following steps. Initially, a layer of pressure sensitive adhesive 12 is coated onto release liner 14. Adhesive 12 may be applied to liner 14 by any suitable means such as by spraying or roll or dip coating. Preferably, adhesive layer 12 is applied in a thickness of from between about 0.002 to 0.010 inches.

A plurality of spaced, elongate raised boundaries are formed on the upper surface 13 of adhesive 12 forming at least one open area running lengthwise thereon. The upper surface 13 is then treated, as described in further detail below, to render it tack free and suitable for printing directly on the treated surface. In a preferred embodiment of the invention as illustrated in FIGS. 2, 3, and 4, the raised boundaries are formed by laminating cover strips 22 and 24 over adhesive surface 12. The ends of cover strips 22, 24 may be connected by an end strip 26 to form a unitary structure or assembly 30 which is laminated to adhesive 12.

As shown, one or more areas of assembly 30 has been removed, such as by die cutting, to leave the corresponding area or areas of adhesive 12 exposed. The periphery of these cut out areas correspond to the final shape of trim strips 10 which are produced. Cover strips 22, 24, 26 and assembly 30 may be of metal, cardboard, paper, or plastic. However, it is preferred that they be of a nonabsorbing material or be treated to be nonabsorbing. Suitable plastics include styrene or polyester having a thickness of approximately 0.004 to 0.008 inches. Alternatively, in a continuous process, cover strips 22 and 24 will be laminated from feed rolls onto a web of release liner 14 having adhesive 12 thereon. In that instance, end stop 26 is not used.

In a preferred embodiment, the cover strips are treated to render their surfaces substantially nonwetting to the liquid plastic resin which is to be cast. Suitable treating agents, which may be applied to cover strips 22, 24, 26 either prior to or after the cut out areas have been removed, include fluorocarbon compounds such as polytetrafluoroethylene and silicones. A preferred treating agent for a polyester cover strip comprises a mixture of polytetrafluoroethylene and Hypalon (trademark of duPont). Hypalon, which is a chlorinated rubber material, improves the adhesion of the treating agent to the polyester substrate and increases the ductility of the coating. The treating agent may be applied in any suitable manner such as by screen printing, spraying, or roll coating.

The exposed areas of adhesive 12 are then treated to render the upper surface 13 of the adhesive tack free and suitable for printing indicia 18 directly thereon. The lower surface of adhesive 12 remains tacky so that the finished article may be adhered to an intended surface. The treatment of upper surface 13 of adhesive 12 to render it tack free may be accomplished by a number of different prodedures. Preferably upper surface 13 may be overcoated with a clear or colored lacquer which forms non-tacky layer 16 and seals the upper surface of the adhesive. Alternatively upper surface 13 may be dusted with a fine powder of inert particles such as mica.

In yet another alternative procedure, a bright metallic surface may be applied to upper surface 13. This can be accomplished by applying a bright metal hot stamp foil to upper surface 13 by means of a pressure roll or the like. The foil is accompanied by a carrier film which is then stripped away leaving bright metal non-tacky surface 16. A metallic non-tacky surface may have a silver or gold color, or other colors may be used as desired. The overall thickness of bright metallic surface 16 is desirably 0.001 inches or less.

Once upper surface 13 of adhesive layer 12 has been rendered tack free, any suitable indicia 18 may be printed directly thereon. These indicia may include letters, numbers, words, symbols, pictures, or other decoration. The printing may be accomplished by any of a number of printing techniques which are known in the art, including silk screen printing. Adhesive layer 12 may itself be colored by the addition of suitable pigment or dye to the composition. If layer 12 is already colored, the need for printing a colored background is eliminated and, in that instance, the need for a non-tacky layer may also be eliminated.

After printing, a liquid plastic resin is cast onto the decorated surface and flows to the edges of cover strips 22, 24. In the preferred embodiment, the amount of liquid resin applied is controlled so that the resin forms a positive meniscus but does not overflow onto cover strips 22, 24. As mentioned, it may also be controlled so as to produce a relatively flat cap should the lens not be desired. Also as preferred, the nonwetting fluorocarbon coating which has previously been applied aids in controlling the flow of plastic. Apparatus suitable for performing the casting operation is more fully described in Waugh, U.S. Pat. No. 4,100,010, the disclosure of which is hereby incorporated by reference.

The plastic resin utilized is preferably a clear thermosetting material which is resistant to abrasion and impact. A number of plastics can be used for this purpose, but one which is particularly advantageous is an impact-resistant polyurethane. Polyurethanes useful in the practice of the present invention are two-part compositions which are the reaction product of a glycol, such as a polyether or polyester glycol, and an aliphatic diisocyanate.

The cast plastic resin is cured or otherwise hardened to form a lens cap 20. The resin is preferably cured by heating or ultraviolet radiation. However, depending on the particular composition utilized, other methods such as radio frequency heating, hot air drying, or even the heat of an exothermic curing reaction may be utilized.

In this preferred process, the edges of the cover strips 22 and 24 act as a knife edge of sorts to sharply cut the adhesive layer as the capped, trim strip as shown in FIG. 1 is separated from the release liner. The polyurethane cap has firmly bonded to the indicia bearing adhesive and the trim strip is, thus, cleanly separated from the assembly.

In an alternative embodiment, the trim strip may be cut from the assembly. In that instance, it is not necessary to use cover strips 22 and 24 and other methods may be used to form the raised boundries. These include the methods taught in Reed, U.S. Pat. No. 4,259,388, and Gilleo, U.S. Pat. No. 4,409,264, which are incorporated herein by reference. Likewise, a raised boundary may be formed by an embossing operation. In this embodiment, it is desirable to render the upper adhesive surface tack-free prior to formation of the raised boundaries. The remaining steps are the same as in the preferred embodiment.

In either embodiment, a unique substrateless (i.e., meaning that it has no metal or plastic foil substrate as such) trim strip is produced. That trim strip may be used in areas of traditional automobile trim strip use. It may also be used as an insert for premolded trim strips, bumpers and bumper guards.

While the invention has been described in detail and by reference to specific embodiments thereof, it will be apparent that numerous modifications and variations are possible without departing from the scope of the invention, which is defined in the appended claims.

What is claimed is:

1. A method of making a substrateless trim strip comprising the steps of:
    (a) providing an elongate layer of pressure sensitive adhesive,
    (b) forming spaced, elongate raised boundaries on a first surface of said layer of pressure sensitive adhesive to provide at least one open area running lengthwise on said elongate layer of pressure sensitive adhesive,
    (c) treating said first surface of pressure sensitive adhesive within said open area to render said first surface tack free and suitable for printing directly on the treated surface,
    (d) decorating said treated surface by printing indicia directly thereon,
    (e) casting a curable liquid plastic resin onto said treated surface so that it flows to the edges of said plurality of elongate raised boundaries, filling the area there between, and
    (f) curing said resin to harden it and provide a substrateless trim strip having a plastic lens cap.

2. The method of claim 1 in which said layer of pressure sensitive adhesive is supported on a release liner.

3. The method of claim 2 wherein a measured amount of said curable liquid plastic is cast onto said treated surface so that it flows to the edge of said raised annular boundaries and forms a positive meniscus without overflowing said raised boundaries.

4. The method of claim 3 in which said raised boundaries are formed by laminating a plurality of elongate cover strips to said first surface of said layer of pressure sensitive adhesive, said elongate cover strips being spaced apart to provide said at least one open area thereon.

5. The method of claim 4 in which said elongate cover strips are coated with a material which renders them poorly wetting with respect to said liquid plastic resin.

6. The method of claim 5 in which said coating material is selected from the group consisting of fluorocarbons and silicones.

7. The method of claim 4 including the steps of peeling said trim strip from said release liner and adhering it to an intended surface.

8. The method of claim 1 in which said treating step includes applying a lacquer over said open area of said pressure sensitive adhesive.

9. The method of claim 1 in which said treating step includes dusting said open area of said pressure sensitive adhesive with a powdered material.

10. The method of claim 9 in which said powdered material is mica.

11. The method of claim 1 in which said treating step includes applying a metallic surface to said open area of said pressure sensitive adhesive.

12. A method of making a substrateless trim strip comprising the steps of:
    (a) providing an elongate layer of pressure sensitive adhesive on a release liner,
    (b) treating the upper surface of said pressure sensitive adhesive to render it tack free and suitable for printing directly on the treated surface,
    (c) forming spaced, elongate raised boundries on said treated surface to form at least one open area running lengthwise on said elongate layer of pressure sensitive adhesive,
    (d) decorating said treated surface by printing indicia directly thereon,
    (e) casting a curable liquid plastic resin onto said treated surface so that it flows to the edges of said plurality of elongate raised boundaries, filling the area there between, and
    (f) curing said resin to harden it and provide a substrateless trim strip having a plastic lens cap.

13. The method of claim 12 wherein said spaced, elongate raised boundaries are formed by an embossing operation.

14. The method of claim 12 wherein said spaced, elongate raised boundaries are formed by creating a low-surface energy dam on said upper surface.

15. The method of claim 12 including the step of cutting said trim strip from said assembly to produce a substrateless trim strip having a release liner.

16. The method of claim 15 further including the steps of removing said trim strip from said release liner and applying it to the intended surface.

* * * * *